United States Patent [19]
Hemphill

[11] Patent Number: 4,616,956
[45] Date of Patent: Oct. 14, 1986

[54] PIPELINE LAUNCHING MODULE
[75] Inventor: Dean P. Hemphill, Houston, Tex.
[73] Assignee: Shell Oil Company, Houston, Tex.
[21] Appl. No.: 618,298
[22] Filed: Jun. 8, 1984
[51] Int. Cl.[4] .............................................. F16L 1/04
[52] U.S. Cl. ..................................... 405/158; 405/61;
405/171
[58] Field of Search ................ 405/61, 154, 158, 166,
405/168, 169, 171, 217

[56] References Cited
U.S. PATENT DOCUMENTS
3,193,260 7/1965 Lamb ................................ 405/61 X
4,126,013 11/1978 McGovern ......................... 405/169

FOREIGN PATENT DOCUMENTS
7413857 5/1975 Netherlands ........................ 405/158

Primary Examiner—David H. Corbin

[57] ABSTRACT

Marine pipelaying is carried out from the surface of floating ice by use of modules which straddle a slot in the ice and carry the pipeline, each module having a large central float which is forced downward into the water and which functions to reduce loading on the sides of the ice slot.

10 Claims, 4 Drawing Figures

PIPELINE LAUNCHING MODULE

BACKGROUND OF THE INVENTION

Due to the limited summer work period in Arctic regions, it frequently is desirable to lay offshore pipelines during the wintertime. This usually necessitates cutting ice slots so that the pipeline may be laid through the ice slot and down to the sea bottom. When underwater pipelaying is undertaken through an opening in the ice, it is often necessary to support large loads from the surface by means of cranes, "A"-frames, etc. Such loads are usually supported directly from the ice. However, as the weight of the load is increased it becomes necessary to distribute the load support over a very wide area on the ice away from the edge of the ice slot. If this is not done, excessive deflections or stresses in the ice may result, possibly leading to failure and injury to personnel or damage to equipment. One means by which loads may be distributed is by the use of so-called straddle cranes, or by large trusses to carry the point of load application well away from the opening in the ice. As the suspended load becomes very large, so does the supporting structure; in fact, the weight of the structure may approach or even exceed the weight of the pipeline.

To some degree, the load capacity of the ice may be increased by artificially thickening the ice by controlled flooding and freezing as is done in construction of ice roads. This is time consuming and costly and may be undesirable in pipeline construction because of the added volume of ice that must then be cut and removed.

SUMMARY OF THE INVENTION

The present invention provided an improvement in efficiency and safety while underwater construction activities are being carried out from the surface of floating ice. In addition, the present invention provides a way in which the above noted deficiencies of the prior art are largely overcome. Thus, the present invention provides for the shared application of buoyancy and direct ice support, in a manner that will handle large forces while retaining precise vertical control of a pipeline to be laid through a slot in the ice. The primary purpose of the present invention is to provide a method and apparatus for laying a pipeline through an ice slot, which method and apparatus are relatively simple and economical to use, and which do not subject the ice surrounding the ice slot to dangerous stresses.

Accordingly, the present invention provides a method for laying a pipeline though ice over water comprising forming an ice slot, supporting the pipeline with a module which straddles the ice slot, reducing the loading on the sides of the ice slot by deploying flotation means from the module through the ice slot and into the water, and moving the module and progressively allowing the pipeline to pass downward through the ice slot.

The present invention also includes an apparatus for laying a pipeline though an ice slot and into underlying water comprising, a module which straddles the ice slot and has means for supporting the pipeline, and flotation means for reducing the loading by the module on the sides of the ice slot, the flotation means being deployable from the module through the ice slot into the water. Preferably, a series of modules is employed and the height of the means for supporting the pipeline is adjustable so that the piepeline is held at different heights at each module in order to reduce bending forces on the pipeline.

It is also intended that the use of shared buoyancy may include other applications than the lowering of pipelines; for example, the deployment of hoists or cranes for the purpose of placing or retrieving heavy objects underwater, while working through a slot in the ice.

Other purposes, distinctions over the art, advantages and features of the invention will be apparent to one skilled in the art upon review of the following:

DESCRIPTION OF PREFERRED EMBODIMENTS

Figure 1:
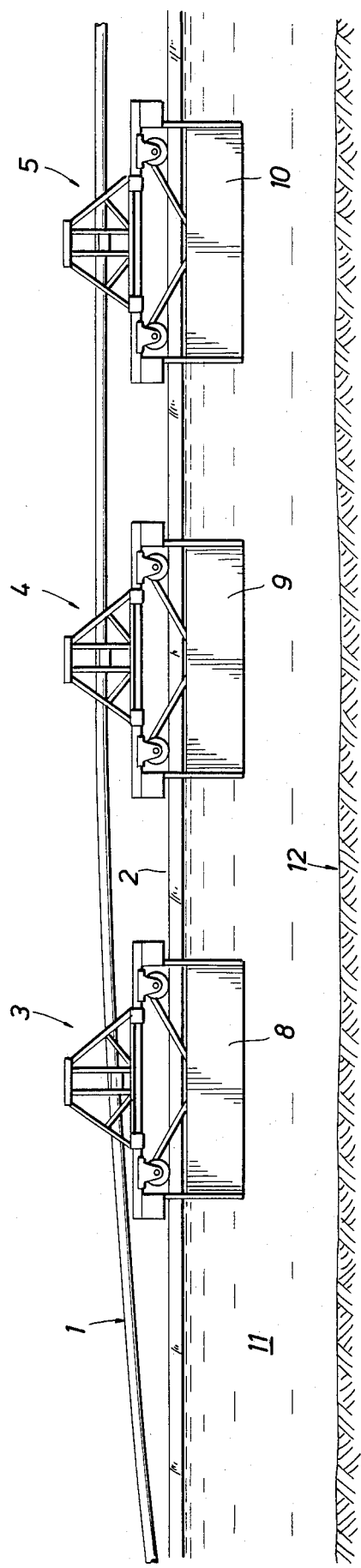
FIG. 1 provides an elevation view of a series of modules supporting a pipeline being deployed to the seabottom through an ice slot.
Figure 2:
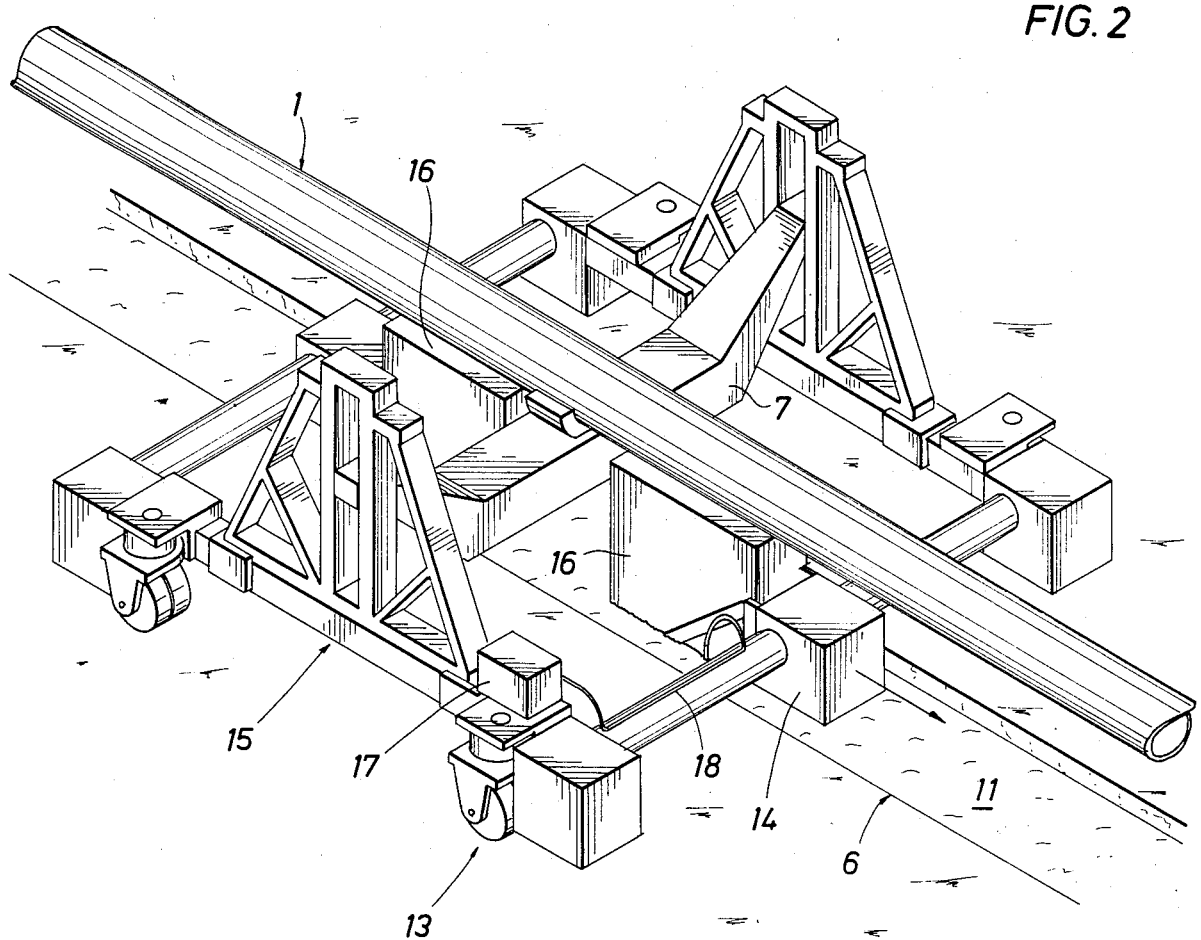
FIG. 2 provides an isometric view of a second embodiment of the module.
Figure 3:
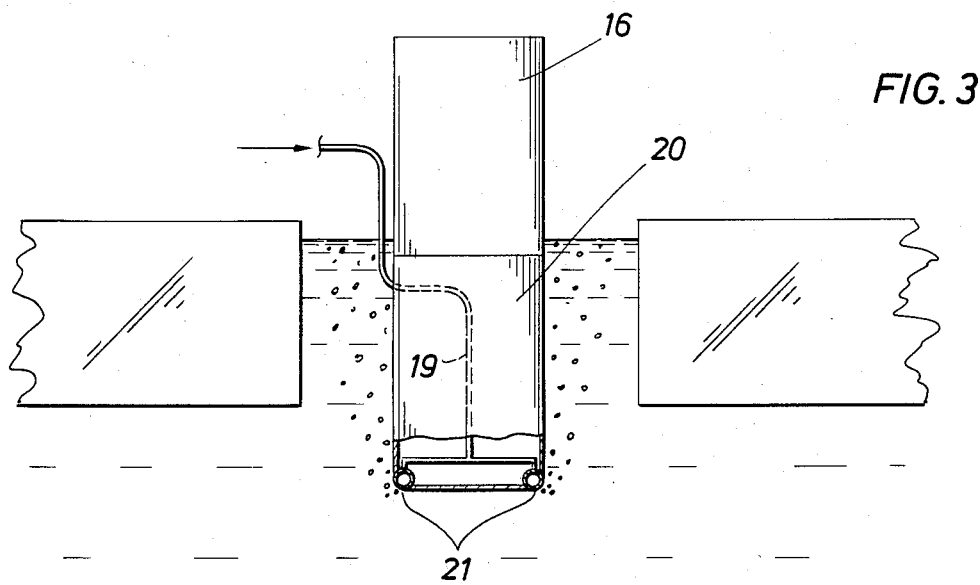
FIG. 3 shows the distribution of an air bubble curtain around the submerged flotation of the module of FIG. 2.

FIGS. 1 and 2 of the drawings illustrate the application of the invention to the launching of a large pipeline 1 from the surface of ice 2. A number of modules 3, 4 and 5 are aligned along and astraddle a narrow ice slot 6 that has been cut in the ice 2. Each module is provided with pipe support means 7, so that by varying the number of modules and the height of the support means 7, the pipeline is transferred from an essentially horizontal ice surface to the point (and required angle) at which it enters the water without exceeding a desired curvature or bending strain.

When modules 3-5 are in position, the large central floats 8-10 are forced downward into the water 11 from their elevated travel position. The buoyancy of the floats 8-10 preferably compensates for the weight of the entire modules 3-5 (more or less, as may be desired). At that time the pipeline 1 may be positioned on the supports 3-5. The ice 2 is required to support preferably only the weight of the pipe 1, and because the deflection of the ice sheet 2 under the reduced load is small, vertical position control relative to the seafloor 12 is greatly improved. This control is best achieved when the floats 8-10 are so sized as to always operate fully submerged. The floats 8-10 and the pipe supports 7 function independently, thus maintaining the vertical control capability. The main frame of the module is best shown in FIG. 2 and is equipped with wheels 13, or the equivalent such as tracks, skids, etc. The module may be self-propelled or towed by tow means shown extending from frame support 14.

The float may be a sealed metal container filled with air or, if desired, with a low density flotation foam. Alternatively, the float may have a bottom open to the sea and provided with vents and air injection systems so as to provide a variably displacement air filled space. Yet another configuration would comprise a flexible air tight bag or bladder that may be inflated so as to provide a variable air volume restrained and protected by the shell of the float, which may have an open bottom or a bottom equipped with openings for the ingress and egress of water as the volume of the bladder is changed.

As a safety feature, the structural parts 15 of the module may be fabricated from sealed circular or rectangular tubes, providing reserve buoyancy in the event of a catastrophic failure of the ice at the slot 6 (24 to 30-inch diameter tubes can provide sufficient reserve to prevent loss of module or pipeline). Reserve buoyancy can also be provided by auxiliary floats 16, as shown in FIG. 2, to be attached to the top of the primary floats at each end so as to pierce the surface of the water under normal operating conditions, contributing no buoyancy until the ice fails and lowers the entire module.

Figure 4:
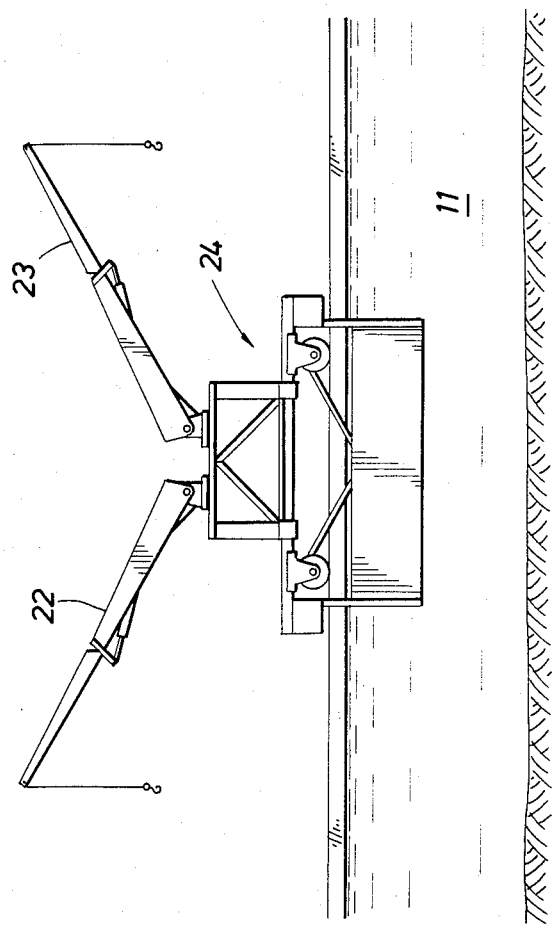
FIG. 4 is an elevation view of a module supporting a crane.

The shared buoyancy technique of the present invention includes applications other than the lowering of pipelines as shown in FIG. 4. One such application is the deployment of hoists or cranes 22 and 23 from module 24 for the purpose of retrieving or placing heavy objects underwater, while working through a slot in the ice. Depending upon the weight of the object, more or less flotation may be deployed from the module though the ice slot and into the water. As shown in FIG. 4, air distribution means may be included so as to permit the creation of a "curtain" of air bubbles to be distributed along the lower edge of the submerged float inducing an upward flow of the slightly warmer seawater from beneath the adjacent ice sheet into the water volume contained by the float and the nearby cold ice; which volume is subject to the rapid loss of heat to the large ice volume and to the usually much colder temperature of the air above. The water volume in the slot will begin to refreeze within a very short time unless the warm water circulation is established. By slowing or preventing the rapid refreeze in the slot, the passage of the train of floats and the lowering of the pipeline is allowed to proceed without interruption. The air distribution means may include an air compressor 17, a conduit hose or pipe 18, valves to control the flow, a distribution tube 19 along each side of the bottom edge of the float 20, and a series of nozzles 21 or holes spaced and oriented to provide the desired distribution pattern upward along the outer side of the float surface. This concept of prevention of freezing by induced warm water circulation using air has been practiced in the maintenance of open dock areas and in the prevention of damage to boats in marinas.

The foregoing description of the invention is merely intended to be explanatory thereof, and various changes in the details of the described method and apparatus may be made within the scope of the appended claims without departing from the spirit of the invention.

What is claimed is:

1. A method for deploying an object through an ice slot into underlying water, comprising:
    supporting the object with at least one module which straddles the ice slot;
    reducing the loading on the sides of the ice slot by deploying flotation from the module through the ice slot and into the water; and
    providing auxiliary reserve buoyancy flotation, substantially submersible only during a failure of the ice surrounding the ice slot and functionable to float the module.

2. The method of claim 1 wherein the object is deployed from cranes supported by the module.

3. The method of claim 1 wherein the object is a pipeline and the module is moved laterally along the ice slot to progressively lower the pipeline into the water.

4. The method of claim 3 including supporting the pipeline with at least two modules which are spaced-apart and aligned over the ice slot, and which hold the pipeline at different heights to reduce bending forces on the pipeline.

5. Apparatus for deploying an object through an ice slot and into underlying water comprising:
    at least one module which straddles the ice slot and having means for supporting the object;
    flotation means for reducing the loading by the module on the sides of the ice slot, the flotation means being deployable from the module through the ice slot into the water; and
    auxiliary reserve buoyance flotation, substantially submersible only during a failure of the ice surrounding the ice slot and functionable to float the module.

6. The apparatus of claim 5 wherein the object is a pipeline.

7. The apparatus of claim 5 wherein the module is constructed of sealed tubes.

8. The apparatus of claim 5 including a crane for supporting the object from the module.

9. The apparatus of claim 8 wherein the quantity of flotation deployable into the water is variable, depending upon the weight of the object.

10. The apparatus of claim 5 including means for distributing an air bubble curtain around the submersed flotation means.

* * * * *